United States Patent [19]

White

[11] 4,424,717

[45] Jan. 10, 1984

[54] FORCE TRANSDUCER

[75] Inventor: Jack M. White, Novelty, Ohio

[73] Assignee: The Babcock & Wilcox Company, New orleans, La.

[21] Appl. No.: 309,635

[22] Filed: Oct. 8, 1981

[51] Int. Cl.³ .............................................. G01L 1/22
[52] U.S. Cl. ..................................... 73/862.65; 338/5
[58] Field of Search ....................... 73/862.65, 862.66; 338/4, 5

[56] References Cited

U.S. PATENT DOCUMENTS 3,341,796 9/1967 Eisele ........................... 73/862.65 X
4,089,217 5/1978 Rahav et al. ...................... 73/862.65

FOREIGN PATENT DOCUMENTS 1433133 4/1976 United Kingdom ............. 73/862.65

Primary Examiner—Charles A. Ruehl
Attorney, Agent, or Firm—John F. Luhrs; Vytas R. Matas; Robert J. Edwards

[57] ABSTRACT

A force transducer for producing an output signal in proportion to the magnitude of an input force wherein an equal and opposite force is produced by a flexure assembly comprised of a compound leaf-spring flexure having opposed outer sections, anchored in and cantilevered from a fixed and a movable base respectively, which gradually decrease in cross-sectional area to a thin middle section wherein the movable base is constrained to linear displacement from a null or neutral position by having the force applied along a line normal to and passing through the center of the thin middle section and transmitted to the movable base through a rigid connection. A modified form of flexure assembly is disclosed comprised of parallel compound flexures each having a thin middle section and opposed outer sections which are anchored in and cantilevered from a fixed common base and a movable common base.

2 Claims, 8 Drawing Figures

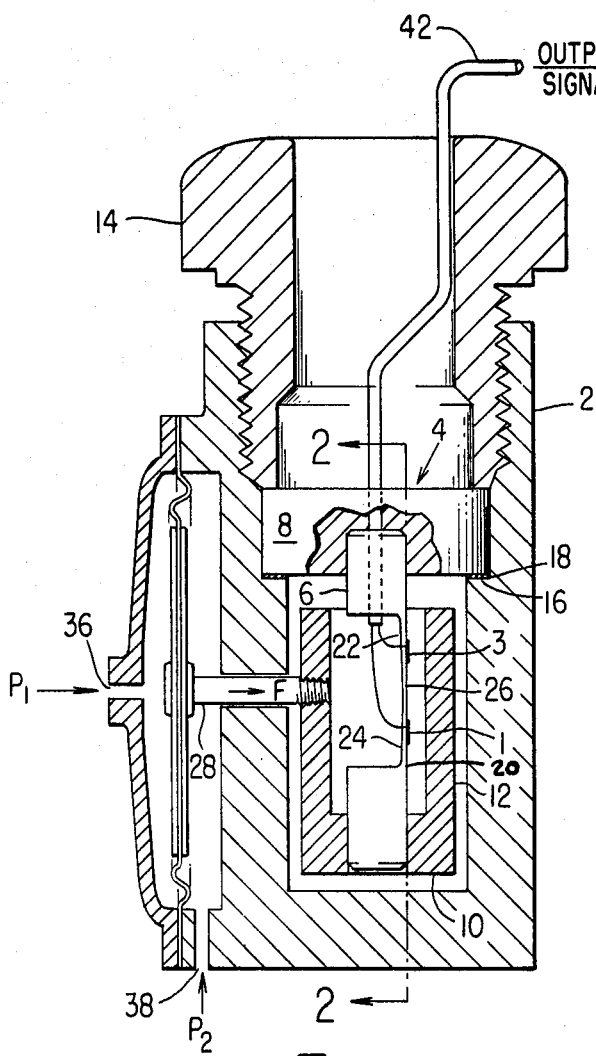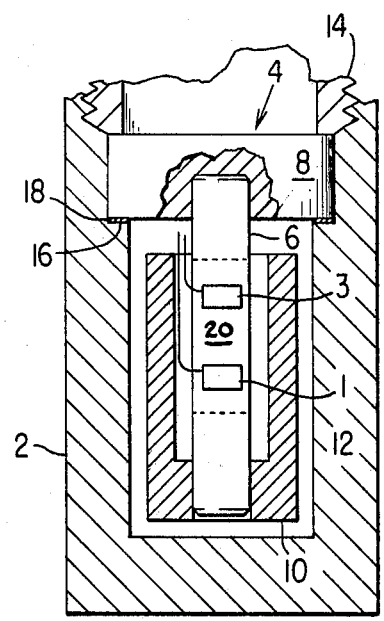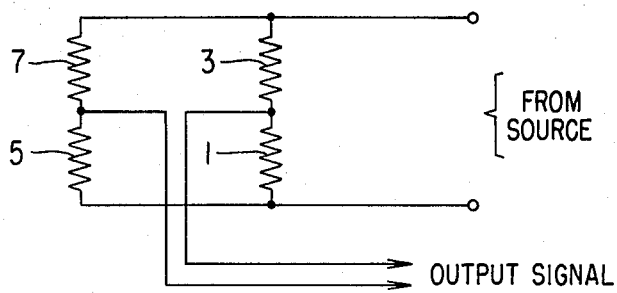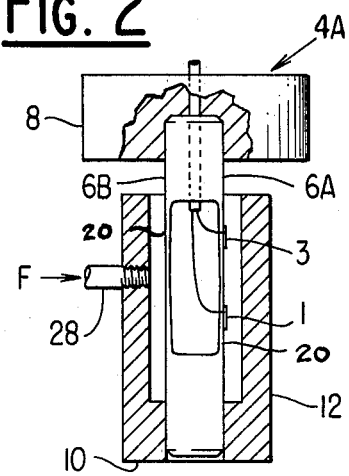
FIG. 1
FIG. 2
FIG. 8
FIG. 5

4,424,717

FORCE TRANSDUCER

This invention relates to a transducer generating an output signal corresponding to an input force. The input force is applied at or near the free end of a leaf spring flexure cantilevered from a fixed support. A force so applied causes a corresponding angular displacement of the flexure about the fixed support in a clockwise or counterclockwise direction depending upon the sense of the input force. The output signal corresponding to the angular displacement of the flexure from a null or neutral position is produced by a strain gauge bonded to or difused on the flexure.

An input force applied at or near the free end of a flexure of constant cross-section area produces a stress and a resulting strain which decreases from a maximum at the fixed support. The maximum allowable stress is limited by the material properties of the flexure. The average stress, which determines the resolution of the transducer, will necessarily be less than the maximum stress.

U.S. Pat. No. 2,487,681 discloses a force transducer in which is incorporated a wedge shaped flexure having a rectangular cross-section area decreasing at a predetermined constant rate from its supported end. Such a flexure is stressed uniformly, to a substantial degree, throughout its length, by an applied input force. The average stress, and hence the resolution of the transducer, is materially increased without exceeding the maximum allowable stress. However, with such a wedge shaped flexure, to obtain straight-line proportionality between the input force and output signal, it is necessary that the input force be applied normal to the flexure as it is angularly displaced from the null or neutral position.

In contrast to this and as an objective this invention comprehends a force transducer wherein the input force causes the free end of the flexure to be linearly displaced parallel to the fixed support to thereby generate an output signal varying in linear proportion to changes in the input force.

It is a further objective of this invention to provide in a force transducer a compound flexure having, on one face a section which is put in tension and a section which is put in compression by the input force.

It is another objective of this invention to provide in a force transducer a compound flexure having maximum cross-section areas at the fixed and free ends decreasing at a predetermined constant rate to a thin middle section.

It is a further objective of this invention to provide a force transducer of compact design generating a output signal of high accuracy and resolution with minimum dead band and hysteresis.

These and other objectives will be apparent as the description proceeds in connection with the drawings in which:

IN THE DRAWINGS

FIG. 1 is a partially sectioned view of an embodiment of this invention.

FIG. 2 is a fragmentary view taken along the line 2—2, in the direction of the arrows, in FIG. 1.

FIG. 5 is a fragmentary illustration of a modified form of flexure assembly.

FIG. 8 is an elementary, one-line diagram of a typical circuit producing an output signal corresponding in magnitude to the magnitude of an input force.

DETAILED DESCRIPTION

Figure 3:
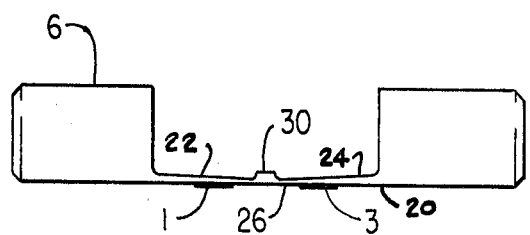
FIG. 3 is a side view of a modified form of flexure.

Referring now to the drawings in which like reference characters designate like or corresponding parts throughout the several views, there is shown a force transducer having a cylindrical housing 2 in which is positioned a flexure assembly, generally indicated at 4. The assembly consists of a compound flexure 6, one end of which is anchored in and cantilevered from a fixed base 8, and the other end of which is anchored in and cantilevered from the closed end or base 10 of a hollow cylinder 12.

The housing 2 is provided with an open end for the insertion and removal of the assembly 4. When inserted, the assembly 4 is held in fixed position by a nipple 14 which, when screwed into the housing 2, clamps the base 8 to the annular face 16. If a pressure seal is required, a washer 18 may be inserted between the fixed base 8 and annular face 16.

The compound flexure 6 has a plane, when in the null or neutral position, rectangular rear face 20 and opposed front faces 22 and 24 converging to a thin middle section 26 to provide maximum rectangular cross-section area at the bases 8 and 10 and which decreases at a predetermined gradiant to a minimum at a thin middle section 26.

Figures 6, 7:
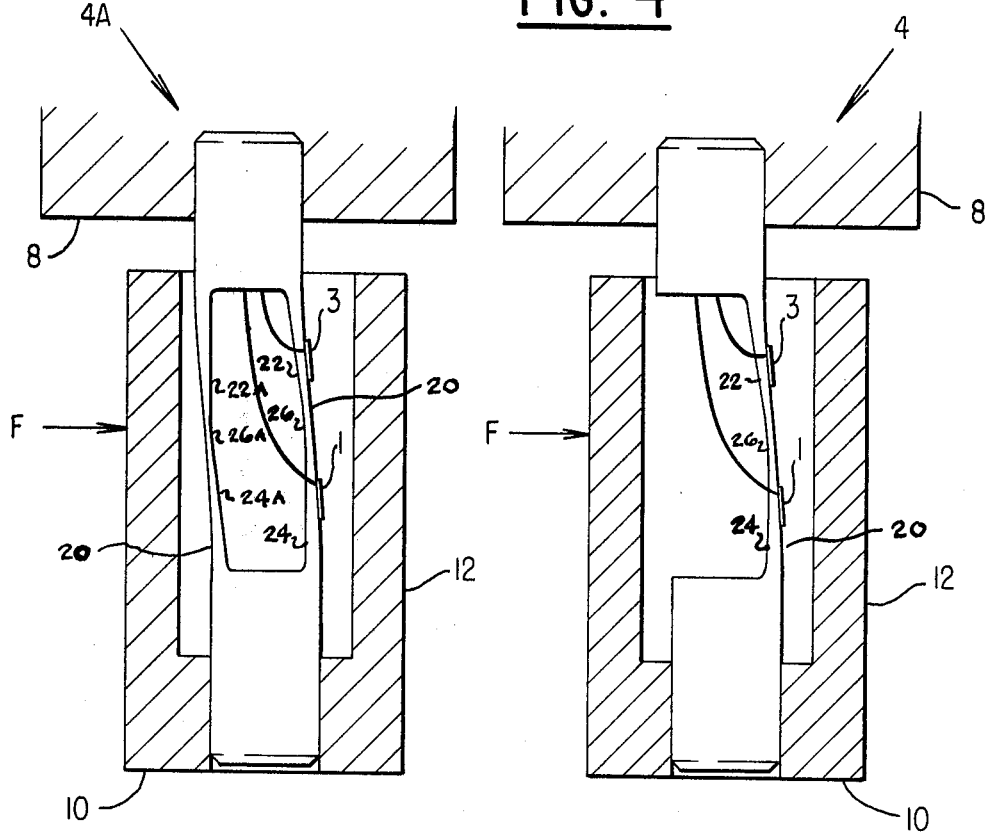
FIG. 6 is a diagrammatic illustration, in exaggeration, the displacement of the flexure shown in FIGS. 1, 2, 3 and 4 produced by and input force.
FIG. 7 is a diagramatic illustrating, in exaggeration, the displacement of the flexure shown in FIG. 5 produced by an input force.

An input force F applied normal to the cylinder 12 by means, such as a rod 28, passing through a penetration in the housing 2 and in line with the center of the thin middle section 26, causes a proportionate linear displacement of the base 10, thus placing face 22 in tension and face 24 in compression, as shown to exaggeration in FIG. 6, recognizing that the maximum linear travel of the cylinder 12 is in the order of 0.004 inches. By having the free end of the flexure 6 constrained to a linear movement, a straight-line relationship between the magnitude of the input force F and strain on the faces 22 and 24 is obtained and hysteresis minimized.

Figure 4:
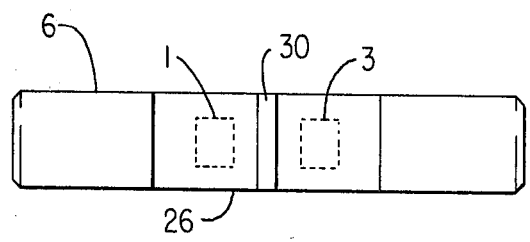
FIG. 4 is a plan view of the flexure illustrated in FIG. 3.

In FIGS. 3 and 4 there is shown a modified form of the flexure 6 wherein there is formed on the thin middle section 26, a ridge 30 running transversely of the longitudinal center-line of the flexure. This requires that, for a designed maximum input force F, the length of the tapered sections 22 and 24 be increased to produce a designed maximum displacement of the flexure from a null or neutral position. Such a modified form of flexure is particularly applicable in the measurement of relatively small ranges in input forces.

In FIG. 5 there is shown a modified form 4A of the flexure assembly comprised of parallel compound flexures 6A and 6B having facing converging sections and plane, rectangular rear faces. Thus there is produced by the force F, tension in diagonally opposed faces 22 and 24A and compression in diagonally opposed faces 22A and 24.

The force transducer comprehended by this invention can be applied to the measurement of any physical condition, such as, but not limited to, absolute, gauge or differential pressure, temperature, liquid level, rate of fluid flow, which can be translated into an input force F. As one illustration of a means for producing the force F, there is shown in FIG. 1, a diaphragm capsule, comprised of a diaphragm connected to the rod 28. An input force F is produced proportional to the difference in pressures $P_1$ and $P_2$ impressed on opposite sides of the diaphragm through ports 36 and 38 respectively.

To generate and output signal proportional to the strain produced by an input force F there may be bonded to or difused on the flexure(s), strain gauges such as shown at 1 and 3, the connections to which pass through one or more pressure type penetrations in the base 8 and a cable 42 to such readout and/or control devices 40 as may be required by the exigencies of a particular application.

As shown, strain gauges 1 and 3 are preferably located on the sections of the rear face 20 subtending front faces 24 and 22 respectively. With this arrangement, strain gauge 3 will be in compression when face 22 is in tension, and strain gauge 1 will be in tension when face 24 is in compression. As evident, an output signal could be produced by a single strain gauge placed on one face of the flexure, however, an enhanced signal, self-compensating for variations in ambient conditions is obtained by a pair of strain gauges, one of which, such as the strain gauge 1, is placed in tension, and the other of which, such as the strain gauge 3, is placed in compression by the input force F.

The strain gauges 1 and 3 may be incorporated in any one of a wide variety of circuit configurations to produce the output signal. As an example of one such circuit there is shown in FIG. 8 an elementary, one-line diagram of a circuit in which strain gauges 1 and 3 are connected in series, in push-pull relationship across a suitable source of potential. Resistances 5 and 7 connected in series across the source and in parallel with strain gauges 1 and 3 complete the circuit configuration.

I claim:

1. In a transducer generating an output signal varying in linear proportion to changes in the magnitude of a force, a flexure assembly comprising a pair of parallel spaced apart flexures each having a maximum cross-sectional area at either end, a single plane rectangular rear face and opposed rectangular front faces converging to a thin middle section, a common fixed base in which one end of each of said flexures is anchored and cantilevered from, a common movable base comprising the closed end of a hollow cylinder surrounding said flexure assembly in which the opposite end of each of said flexures is anchored and cantilevered from, a force receiving linearly movable rod positioned normal to the longitudinal center-line of said flexure assembly and in line with the centers of said thin middle sections anchored in the cylindrical wall of said hollow cylinder to produce a linear displacement of said movable base normal to the longitudinal center-line of said flexure assembly proportional to the magnitude of a force applied to said movable rod, and a strain gage mounted on the rear face of at least one of said flexures in an area subtended by one of the front faces thereof to generate an output signal proportional to the strain in said area produced by a force applied to said movable rod.

2. In a transducer as set forth in claim 1 wherein each flexure is formed with a ridge normal to the longitudinal centerline thereof and passing through the center of said thin middle section.

* * * * *